Patented Oct. 26, 1937

2,096,764

UNITED STATES PATENT OFFICE 2,096,764

OIL VARNISH AND PROCESS OF MAKING SAME

John B. Rust, Orange, N. J., assignor to Ellis-Foster Company, a corporation of New Jersey No Drawing. Application July 27, 1935,
Serial No. 33,563

3 Claims. (Cl. 134—26)

This invention relates to varnish oil resin compositions and the process of making them.

It relates particularly to compositions comprising a phenolic acetaldehyde resin and drying oils of the class of tung, linseed, soya bean, and perilla oil.

Generally when an oil soluble synthetic resin of the phenol-aldehyde class is cooked with a drying oil the color of the varnish base is preserved throughout the heating process yielding, if the original resin is light colored, a light colored base, and a dark colored base if the resin is dark colored. The present invention is concerned with the production of substantially light colored varnish bases from relatively dark colored resins.

When acetaldehyde is condensed with a phenol such as carbolic acid, cresol or xylenols in the presence of an acid condensing agent resins are formed which usually are dark colored due to the formation of a dark colored by-product. The resins range from soft solids to hard brittle resins depending upon the amount of acetaldehyde used, the concentration of the condensing agent and the point to which the condensation is allowed to proceed. Furthermore the color of the resins ranges from very dark brown to light brown, also depending upon the above enumerated factors. I have found that certain phenolic acetaldehyde resins are soluble in drying oils and that when cooked with said drying oils, under the conditions specified below, a color change takes place and the varnish base gradually lightens to finally produce an oil-resin base the color of which is substantially lighter than the color of the base at the beginning of the heating process. During the cooking the material which is responsible for the dark color of the resin is either volatilized or combined with the drying oil resulting in a lightening of color. The latter explanation seems to be the more tenable since if the resin is heated without drying oil to the same temperature as that used with the oil-resin compositions no lightening is noticeable.

The temperature at which lightening of the varnish base takes place is in general above 200° C. and preferably from 240° to 270° C. when tung oil is used as the drying oil component. These temperatures are such that varnishes of excellent water, acid, alkali and weathering resistance are secured. However, it should be understood that the above critical temperatures are given as those preferred and should not be construed as limiting since there is some variation depending upon the particular resin and drying oil used.

Certain of the phenolic-acetaldehyde resins described in this invention lighten when cooked with drying oils to a greater degree than others. In general those resins using paraldehyde as the resinifying agent lighten the most. The reason for this does not lie in the color of paraldehyde-phenol resins, since such resins may be made fairly light colored as will be described below, but rather probably that more unstable coloring material is formed when paraldehyde is used than when acetaldehyde is used.

Color changes described were measured in accordance with the directions given by Henry H. Gardner in Physical and Chemical Examination of Paints, Varnishes, Lacquers and Colors, 4th edition, October 1927, Table 61, page 480, for color standards of varnish solutions.

Another aspect of this invention is embodied in the production of varnishes from certain acetaldehyde-phenol resins to yield substantially color-stable films. Many oil-soluble synthetic resins of the phenol-aldehyde class give varnish films with drying oils which discolor when the films have hardened by oxidation, or polymerization. This phenomenon is general and no prediction can be made as to whether a given oil-soluble resin when cooked with a drying oil will yield a film which upon drying is color-stable. Non-yellowing varnishes have wide-spread use in decorative paints and enamels where color and tint are paramount. I have found that resins made from acetaldehyde or paraldehyde and a phenol which contains a side-chain meta to the hydroxyl such as meta cresol and meta (5) xylenol (symmetrical), give excellent varnishes with drying oils which have the advantage of being color stable and not yellowing or discoloring upon drying or aging.

Thus, a meta cresol-acetaldehyde resin when cooked with a mixture of tung and linseed oil, thinned with a suitable solvent and metallic drier added exhibits only slight color change, and yields a light-colored varnish corresponding to the Gardner color standard #6. Furthermore a film of the varnish upon drying does not discolor, but remains substantially water-white. On the other hand, if an identical preparation is made using para cresol for the phenol a varnish corresponding to the Gardner color standard #10 is obtained and a film of the varnish upon drying takes on a brown coloration. Although discoloration is not an objection when dark pigments are used, as in priming coats and commercial rust, fume and weatherproofing, it definitely limits the use of such resins. By using the resins from meta substituted phenols and acetaldehyde, however, light colored pigments and dyes may be used and the original color of the pigment or dye preserved when the varnish film has dried.

Although I have stated that with certain phenol-acetaldehyde resins a lightening in color of a varnish melt takes place when the varnish is heated between 240° and 270° C., it is desirable to use fairly light colored resins. I have found that by using nickel salts in conjunction with an acid catalyst substantially lighter resins are produced than if only the acid were used. Still another method is to use an excess of acetaldehyde solution, for instance, about 5 moles of a 35% aqueous solution to 1 mole of a phenol. A pronounced difference in color is also produced in a varnish solution by using a very dilute solution of acetaldehyde, for instance, 20% to 25% in making the resin. Relatively light colored resins may be made with paraldehyde and a phenol by adding a large volume of water to the reaction mixture.

The following are examples serving better to illustrate the nature of the invention and the manner in which the same is to be performed. All proportions are in parts by weight.

*Example 1.*—54 parts of commercial cresols consisting of a mixture of meta and para cresol were mixed with 30 parts of paraldehyde and 100 parts of water. The mixture was then heated on a steam bath at 90° C. under a reflux condenser. 20 parts of 35% hydrochloric acid solution were added and the reaction allowed to proceed for about 2 hours. A water layer formed on top of a resin layer and the former was decanted. The resin was washed with water to remove excess paraldehyde and acid, then heated in an open container to drive off water and harden. The final temperature of the resin melt was about 200° C. The resin was dark in color, hard and brittle.

34 parts of tung oil and 17 parts of the above resin were heated together up to 260° to 270° C. and held at this temperature for 7 minutes, then at 290° C. for 1½ minutes after which it was cooled immediately. During the first 7 minutes of heating the varnish base lightened considerably in color. At first it was dark colored being almost black, but as the heating progressed the color changed yielding a pale yellow, transparent base. This base was thinned with VM and P naphtha and 3% of a 33⅓% solution of lead-cobalt naphthenate drier in the same solvent added. A film of the varnish dried rapidly.

*Example 2.*—30 parts of perilla oil were mixed with 15 parts of the resin of Example 1 and heated to 290° C. for ½ hour. During this time the base lightened from a dark brown to yellow color. It was thinned with VM and P naphtha and 7% lead-cobalt naphthenate drier solution added. A film of the varnish was slow in drying as is characteristic of perilla oil varnishes.

*Example 3.*—34 parts of tung oil and 6 parts of linseed oil which had previously been heated at 300° C. for 2½ hours were mixed and 20 parts of the resin of Example 1 added. The mixture was heated to 130° C. at which temperature the resin dissolved completely in the oils. 20 parts of the homogeneous melt were poured out and thinned with 15 parts of xylene and 5 parts glycol monoethyl ether. This solution had a color corresponding to the Gardner color standard #8. Heating of the original melt was continued until the temperature reached 270° C. whereupon 20 parts were removed and diluted with 15 parts of xylol and 5 parts of glycol monoethyl ether. This varnish solution had a color corresponding to the Gardner color standard #5, indicating a lightening from dark brown to yellow. Heating of the remaining 20 parts was continued at 270° C. for 5 minutes, then at 250° C. until the composition had become well bodied. This was finally diluted with 20 parts of VM and P naphtha. With driers a film of the varnish dried hard and tough.

*Example 4.*—54 parts of a commercial grade of cresylic acid, light straw colored, 50% of which distills over below 207° C. and 95% distills over below 220° C., were mixed with 30 parts of paraldehyde and 100 parts of water. 20 parts of a 35% hydrochloric acid solution were added and the mixture heated under a reflux condenser at 90° C. on a steam bath for 4 hours. The resin which formed was washed with water, then heated to 200° C. to dehydrate and harden. The final material was a hard, brittle, somewhat dark colored resin.

20 parts of the above resin were mixed with 34 parts of tung oil and 6 parts of linseed oil which had previously been heated at 300° C. for 2½ hours. The mixture was heated to 130° C. when the resin dissolved completely in the oil. 5 parts of the homogeneous melt were poured out and diluted with 5 parts of an equal mixture of xylene and glycol monoethyl ether. The solution had a color corresponding to the Gardner color standard #6. The melt was then heated to 270° C. and 5 parts poured immediately. This was diluted with 5 parts of an equal mixture of xylene and glycol monoethyl ether. The solution had a Gardner standard color of #5. Heating of the remainder of the melt was carried out at 270° C. for 6 minutes, at 250° C. until the base was well bodied and then thinned with 50 parts of VM and P naphtha. With drier a film of the varnish dried hard and tough.

*Example 5.*—115 parts of the commercial grade of cresylic acid used in Example 4 and 58 parts of acetone were mixed and 10 parts of 35% hydrochloric acid solution added. The mixture was refluxed at 90° C. for 4½ hours, then the crude reaction product washed with water. 165 parts of a 33⅓% acetaldehyde solution in water were mixed with the reaction product and 35 parts of 35% hydrochloric acid solution added and the mixture refluxed for 8 hours at 90° C. The resin which formed was washed with water, steam distilled to remove soft by-products and finally heated to 200° C. to dehydrate and harden. The resulting resin was hard, brittle and relatively dark colored.

20 parts of the above resin were mixed with 34 parts of tung oil and 6 parts of linseed oil which had previously been heated at 300° C. for 2½ hours. The mixture was heated to 120° C. when the resin dissolved completely in the oil, giving a homogeneous melt. 5 parts of the melt were poured out and diluted with 5 parts of an equal mixture of xylene and glycol monoethyl ether. The solution had a color corresponding to #8 Gardner color standard. The melt was heated to 270° C. and another 5 parts removed and diluted with an equal weight of the xylene cellosolve mixture. The solution had the color of #6 Gardner color standard. Heating of the remaining 50 parts of varnish was continued at 270° C. for 6 minutes, at 250° C. until well bodied, then diluted with 50 parts of VM and P naphtha. With driers a film of the varnish dried hard and tough.

*Example 6.*—61 parts of symmetrical xylenol and 114 parts of a 29% aqueous solution of acetaldehyde were mixed and 15 parts of a 35% hydrochloric acid solution added. The mixture was heated under a reflux condenser at 90° C. for about 5 hours. The resin which formed was washed thoroughly with warm water to remove acid and unreacted acetaldehyde, then heated to 200° C. to dehydrate and harden. The final resin was somewhat soft, possessed a pale yellow color and was readily soluble in all drying oils.

20 parts of the above resin were mixed with 25 parts of tung oil and 5 parts of linseed oil which had previously been heated at 300° C. for 2½ hours. The mixture was heated to 270° C. and held at this temperature for 42 minutes. When still hot it was diluted with an equal weight of VM and P naphtha. The varnish solution had a color corresponding to #5 Gardner color standard. 1.1 parts of a 33⅓% solution of lead-cobalt naphthenate drier in VM and P naphtha were added. A film of the varnish dried dust-free in 2 hours and was tack-free in 4 hours. The film when it had dried remained substantially water-white, with no discoloration appearing.

*Example 7.*—The resin from Example 6 was steam distilled to remove excess xylenol and soft by-product, yielding a very pale yellow hard brittle resin.

10 parts of the steam distilled resin were mixed with 17 parts of tung oil and 3 parts of linseed oil which had previously been heated to 300° C. for 2½ hours. The mixture was heated to 270° C. for 30 minutes, then at 250° C. for 20 minutes. The resulting varnish base was diluted with VM and P naphtha to form a 50% solution which had a Gardner color standard between #5 and #6. 0.9 part of a 33⅓% solution of lead-cobalt naphthenate drier in VM and P naphtha was added. The varnish dried rapidly to give a water-white, color stable film.

*Example 8.*—36 parts of pure meta cresol were mixed with 55 parts of a 33⅓% aqueous acetaldehyde solution and 15 parts of a 35% hydrochloric acid solution. The mixture was heated under a reflux condenser at 90° C. for about 4 hours. A resin formed rapidly which was washed thoroughly with water, then heated to 200° C. to dehydrate and harden. The resin was rather dark colored, hard and brittle. Meta cresol reacts at greater rate with acetaldehyde than do most phenols.

15 parts of the above resin were mixed with 25 parts of tung oil and 5 parts of linseed oil which had previously been heated to 300° C. for 2½ hours. The mixture was heated to 270° C. for 30 minutes. The varnish base was thinned with 20 parts of VM and P naphtha and 25 parts of xylene and 3% of a naphthenate drier solution added. A film of the varnish dried dust-free in 1½ hours and was entirely dry in 4 hours. When thoroughly dry the film showed no discoloration, but remained practically water-white.

*Example 9.*—10 parts of the resin of Example 8 were mixed with 17 parts of tung oil and 3 parts of linseed oil which had previously been heated at 300° C. for 2½ hours. The mixture was heated to 270° C. for 6 minutes, then at 250° C. until the oil-resin composition had taken on sufficient body. The base was thinned with 10 parts of xylene and 5 parts of glycol monoethyl ether. The solution had a color corresponding to #6 Gardner color standard. 0.9 part of lead-cobalt naphthenate drier solution was added and a film brushed onto a glass plate. The film dried hard and tough and did not discolor.

The following examples are given to illustrate the effect of excess water upon phenol-acetaldehyde resins for producing light-colored varnish compositions. The effect is profound since a color change from #9 Gardner color standard to #6 is equivalent to passing from dark brown to yellow.

*Example 10.*—115 parts of the commercial cresylic acid used in Example 4 were mixed with 165 parts of a 33⅓% aqueous acetaldehyde solution and 25 parts of a 35% hydrochloric acid solution. The mixture was heated under a reflux condenser at 90° C. for about 4 hours. The resin which formed was then washed and heated to 200° C. to dehydrate and harden. It was dark brown in color, hard and brittle.

20 parts of the above resin were mixed with 34 parts of tung oil and 6 parts of linseed oil which had previously been heated to 300° C. for 2½ hours. The mixture was heated to 270° C. for 5 minutes then at 250° C. until the base had become well bodied. It was then thinned with 60 parts of VM and P naphtha and by comparison had a color of #9 Gardner color standard.

*Example 11.*—54 parts of the commercial cresylic acid used in Example 4 were mixed with 85 parts of a 35% aqueous acetaldehyde solution, 45 parts of water and 20 parts of a 35% hydrochloric acid solution. The mixture was heated under a reflux condenser for about 4 hours at 90° C. A resin formed which was washed with water, then heated to 200° C. to dehydrate and harden. The final resin was brown in color, hard and brittle.

20 parts of the above resin were mixed with 34 parts of tung oil and 6 parts of linseed oil which had previously been heated to 300° C. for 2½ hours. The mixture was heated to 270° C. for 6 minutes, then at 250° C. until the varnish composition had become well bodied. The base was thinned with an equal weight of VM and P naphtha and by comparison had a color of #6 Gardner color standard.

Films from varnishes of both Examples 10 and 11 dried rapidly to hard, tough surfaces.

*Example 12.*—One part of a commercial grade of cresylic acid light straw colored 50% of which distills over below 208° C. and 95% distills over below 220° C. was mixed with 2 parts of a 29% aqueous solution of acetaldehyde and 0.2 part of a 35% hydrochloric acid solution. The mixture was heated on a steam bath under a reflux condenser at 90° C. for 2½ hours. A supernatant water layer was decanted and the resin washed repeatedly with hot water to remove acid and unreacted acetaldehyde. It was then heated to 200° C. in an open container to remove water and to harden. The resin was dark in color and was hard and brittle. It had a softening point of 72° C.

3 parts of the above resin were mixed with 5 parts of raw tung oil and 1 part of linseed oil bodied by heating for 2½ hours at 300° C. The mixture was heated in a glass container to 270°–280° C. and held at this temperature for about 20 minutes until the varnish base had become bodied sufficiently and had lightened in color.

At the beginning of the heating a stirring thermometer could just be seen through a ½ inch thickness of the varnish base. At the end of the operation under the same conditions the thermometer could be seen through a 1½ inch thickness of the base. The base was dissolved in an equal weight of VM and P naphtha and 2% lead-cobalt naphthenate drier solution added. A film of the varnish dried rapidly to a tough, hard coating.

Mixtures of drying oils may be used as desired to secure best results. For instance, tung oil and linseed oil or tung oil and soya bean oil may be used in combination or the second oil may be added to the tung oil-resin base after the latter has been cooked the desired length of time. The best procedure for making a varnish for a specific purpose must be determined by experiment, but processes which have been found satisfactory have been given in the examples.

The varnish bases may be thinned with any suitable thinner such as VM and P naphtha, gasoline, xylene, toluene or mixtures of these. Lead, cobalt and manganese driers may be cooked into the varnish bases by adding salts of the aforesaid to the hot varnish base or they may be added later to the finished varnish in the form of soluble organic salts such as lead, cobalt or manganese naphthenate.

Finally the varnish may be used clear or it may be ground with pigments, dyes or fillers and used as a paint or enamel. Other uses for the varnish bases are as an impregnant for waterproofing cloth, for electrical insulation or with fillers for use in linoleum compositions. The bases may also be used without driers and may be hardened by heat.

The phenols comprehended by this invention are the simple phenols such as phenol, the cresols and the xylenols or mixtures of these. They may be considered distinct from the phenols such as para tertiary butyl phenol or amyl phenol which are synthetic and at present more expensive. The simple phenols include those found in coal tar acids and a mixture of simple phenols may comprise the total crude coal tar acid fraction, or any fraction or cut thereof.

The acetaldehyde resins here described may be cooked for very long periods of time with such drying oils as do not readily body when heated. However, the resins are readily soluble in drying oils and may be added to the oils after they have been heat bodied, allowing an interval of cooking with the resin so that the finished varnish base may be light in color.

There are three factors to be considered in the production of oil-soluble acetaldehyde resins. Firstly, the color of the resin; second, the color of the varnish solution; and third, the color of the dried film. Very pale colored resins are produced from symmetrical xylenol and acetaldehyde. This is a unique resin since all others made from the simple phenols and acetaldehyde are substantially brown colored. The color of the varnish solution in general is not alone dependent upon the color of the resin, since those resins made from paraldehyde and a phenol in the presence of water show a marked lightening when cooked with drying oils. This effect is also shown to a somewhat less degree with resins made from dilute acetaldehyde solutions and a phenol. Lastly, the color of a dried varnish film is dependent upon two factors. The first factor, obviously, is the color of the varnish solution, but the second factor, film discolorization, which is the more important, is dependent upon the resin. The phenols which produce acetaldehyde resins giving light-stable films are those containing a side chain meta to the phenolic hydroxyl. An acid condensing agent has been found the best for the type of resin hereinabove described.

What I claim is:

1. A light colored tung oil varnish comprising cooked tung oil and a phenolic-acetaldehyde resin, the resin being produced by reacting crude coal tar phenols, such phenols consisting essentially of one of the class consisting of meta cresol and symmetrical xylenol, with one of the class consisting of acetaldehyde and paraldehyde, the said varnish composition being prepared by cooking together drying oil and the said resin at temperatures above 200° C., whereby a bleaching action takes place and the final product is light colored and transparent in thin films.

2. A light colored varnish comprising a drying oil and a phenolic-acetaldehyde resin, the said resin of which is produced by reacting crude phenols derived from coal tar, such phenols consisting of one of the class of crude cresols, crude cresylic acid, and crude xylenols with acetaldehyde, the said varnish composition being prepared by cooking together a drying oil and the said resin, and during the cooking procedure raising the temperature of the oil and resin composition above 200° C., whereby a bleaching action takes place and the color of the final product is not greater than 7 Gardner color standard.

3. A light colored varnish comprising a drying oil and a phenolic-acetaldehyde resin, the said resin of which is produced by reacting phenols, such phenols consisting essentially of one of the class consisting of meta cresol and symmetrical xylenol, with one of the class consisting of acetaldehyde and paraldehyde, the said varnish composition being prepared by cooking together drying oil and the said resin at temperatures above 200° C., whereby a siccative composition is obtained which is characterized by its ability to dry light colored and non-yellowed in coating films.

JOHN B. RUST.